United States Patent Office 3,274,228
Patented Sept. 20, 1966

3,274,228
TRIPHENYLPHOSPHINEMETHYLENE
COMPOUNDS
James J. Pappas, Flushing, N.Y., and Edward Gancher, Clifton, N.J., assignors to Interchemical Corporation, New York, N.Y., a corporation of Ohio
No Drawing. Filed July 29, 1963, Ser. No. 298,396
4 Claims. (Cl. 260—465)

This invention relates to colored triphenylphosphinemethylene compounds, the preferred members of which are represented by the general formula $$\left[\underset{3}{\underset{}{\text{C}_6\text{H}_5}}\right]_3\text{—P=C}\underset{R_2}{\overset{R_1}{\diagdown}}$$

where $R_1$ represents a benzene nucleus containing from 1 to 3 nitrogroups as substituents and $R_2$ is a member selected from the group consisting of—

$$-\text{CN}, \quad -\text{CO}_2\text{CH}_3, \text{ and } -\text{CO}\underset{}{\diagup}\text{C}_6\text{H}_5$$

The synthesis is carried out by reacting a triphenylphosphinemethylene with a nuclearly-substituted halo aromatic. A byproduct is formed in the reaction in an amount equal to that of the desired end product. The byproduct, however, may be conveniently removed from the reaction vessel and returned to the raw material feeder, where it is transformed to the original triphenylphosphinemethylene compound and recycled with the latter to the reaction zone. Removal and recycling was not done in the illustrative examples that follow, since such a technique is more suited to plant-scale operations and equipment.

The colors of the compounds may be varied by changing the $R_1$ and $R_2$ substituents. Some of the possibilities are shown by the following table.

| Example | $R_1$ | $R_2$ | Color |
|---|---|---|---|
| 1 | 2,4,6-trinitrophenyl 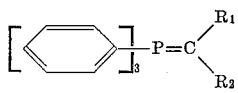 | —CN | Violet brown. |
| 2 | 2,4,6-trinitrophenyl | —CO$_2$CH$_3$ | Violet Red. |
| 3 | 2,4-dinitrophenyl | —CN | Orange. |
| 4, 5, 6 | 2,4-dinitrophenyl | —CO$_2$CH$_3$ | Red. |
| 7 | 2,4-dinitrophenyl | —CO—C$_6$H$_5$ 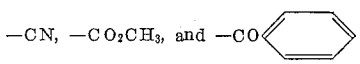 | Orange. |

Besides color changes, variations in $R_1$ and $R_2$ may be manipulated to enhance stability towards heat, water and light.

The preferred types of compounds of this invention were defined above, but it is to be understood that other related forms are intended to be encompassed herein, for instance in the above general formula, $R_2$ may also be —CO$_2$NH$_2$,

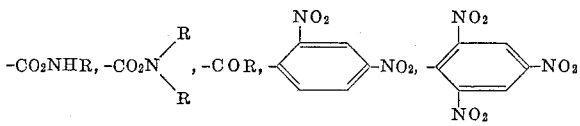

where R can be any of a number of groups; alkyl, alkoxy, aryl, etc. The phenyl rings attached to the phosphorus atom may also have many types of substituents, alkyl, alkoxy, halogen, amino, dimethylamino, etc.

The compounds of this invention may be used as colorants, either dyestuffs or pigments, depending on the solubilities of the particular compounds. The water-insoluble types may be used in textile printing compositions, in coating compositions or may in some cases be applied directly to surfaces in the form of solutions, dispersions, etc.

The examples that follow are given by way of illustration; the invention not being restricted thereto.

*Example 1*

4.00 g. of triphenylphosphinecyanomethylene and 1.64 g. of picryl chloride were dissolved in 120 ml. of dry benzene and heated on a steam bath 2 hours under a blanket of nitrogen. The salt was filtered off after cooling to room temperature. The solvent was evaporated off and the solid residue was crystallized from a methanol-water solvent. 1.77 g. were obtained of crystalline violet brown material, melting at 245–246° C.

*Example 2*

2.00 g. of triphenylphosphinecarbomethoxymethylene and 0.74 g. of picryl chloride were dissolved in 20 ml. of dry benzene and heated on the steam bath 1 hour under a blanket of nitrogen. The salt was filtered off after cooling to room temperature. The residue recovered by evaporating off the solvent was crystallized from a methanol-water solvent. The 0.93 g. of violet red crystals recovered melted at 192–193° C.

*Example 3*

10.00 g. of triphenylphosphinecyanomethylene and 3.35 g. of 1-chloro-2,4-dinitrobenzene were dissolved in 200 cc. dry benzene and refluxed 70 hours under an atmosphere of nitrogen. After cooling, the precipitate was filtered off, washed with water to remove the salt, dried and recrystallized from benzene/petroleum ether solvent. The bright orange product weighed 2.30 g. and melted at 249–250° C.

*Example 4*

2.00 g. of triphenylphosphinecarbomethoxymethylene and 0.61 g. of 1-chloro-2,4-dinitrobenzene in 40 cc. of dry benzene were allowed to reflux 70 hours under an atmosphere of nitrogen. After cooling, the salt was filtered off. To the filtrate was added an equal volume of petroleum ether. The red precipitate formed was filtered off, washed with water, and crystallized with methanol-water solvent. The 0.39 g. of bright red crystals obtained melted at 230–231° C.

*Example 5*

Example 4 was repeated except that 50 ml. of N,N-dimethylformamide was used as the solvent. 0.35 g. of end product had properties corresponding to the product of Example 4.

*Example 6*

(A) 10.0 g. of 2,4-dinitrobenzyl bromide were dissolved in 200 ml. of benzene. A solution of 10.6 g. triphenylphosphine in 20 ml. benzene was added over a 5 minute period. The batch was allowed to stand 16 hours. A gummy substance separated out. The benzene was decanted off, the gum heated up with 200 ml. benzene, and the benzene was again decanted off. The gum was taken up in water and the solution brought to the alkaline side. The dark red crystals that separated were filtered, washed with water, dried, and crystallized from benzene. There were thus obtained 6.9 g. of dark red triphenylphosphine (2,4-dinitrophenyl) methylene melting at 209–210° C.

(B) 1.00 g. of the above product was refluxed 40 hours with 10 ml. of methyl chloroformate in 50 ml. of dry benzene under a blanket of nitrogen. The batch was then cooled, the salt filtered off, and the solvent evaporated off. Methanol was added and the unreacted material filtered off. The filtrate was concentrated to dryness and the resultant solid crystallized from benzene/petroleum ether solvent. The 0.11 g. of bright red product obtained melted at 230–231° C.

*Example 7*

6.57 g. of (4-nitrobenzyltriphenyl) phosphonium chloride were slurried with 200 ml. dry benzene under a blanket of nitrogen. There were then gradually added 10 ml. of 1.67 M butyl lithium hexane solution over a period of 10 minutes. After the solution was stirred 4 hours, 1.28 g. of benzoyl chloride were added, and stirring continued for 16 hours. The salt was filtered off and washed with three 50 ml. portions of hot benzene. The filtrate was diluted with 1500 ml. of petroleum ether and the precipitated solid filtered off and recrystallized from chloroform-methanol solvent. 2.25 g. of orange product having a melting point of 206–207° C. were obtained.

What is claimed is:

1. The compound represented by the formula

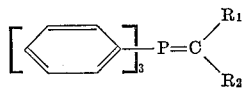

wherein $R_1$ is a benzene nucleus containing from 1 to 3 nitro groups as substituents and $R_2$ is a member selected from the group consisting of —CN, —$CO_2CH_3$, and

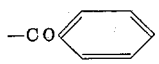

2. The compound represented by the formula

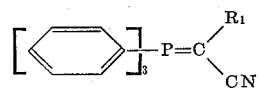

wherein $R_1$ is a benzene nucleus containing from 1 to 3 nitro groups as substituents.

3. The compound represented by the formula

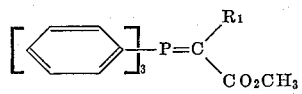

wherein $R_1$ is a benzene nucleus containing from 1 to 3 nitro groups as substituents.

4. The compound represented by the formula

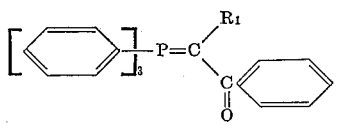

wherein $R_1$ is a benzene nucleus containing from 1 to 3 nitro groups as substituents.

References Cited by the Examiner

FOREIGN PATENTS 813,539  9/1954  Great Britain.

OTHER REFERENCES

Horner et al.: Justus Liebigs Annalen der Chemie, 1955, vol. 591, pages 69–98.

Mel'nikov et al.: Chemical Abstracts, vol. 31, 1937, pages 4288–4290.

CHARLES B. PARKER, *Primary Examiner.*

DALE R. MAHANAND, *Assistant Examiner.*